(12) United States Patent
Vaughn

(10) Patent No.: US 12,516,777 B2
(45) Date of Patent: *Jan. 6, 2026

(54) STORAGE TANK

(71) Applicant: Dast Tanks, LLC, Enid, OK (US)

(72) Inventor: Terry Vaughn, Enid, OK (US)

(73) Assignee: Dast Tanks, LLC, Enid, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,650

(22) Filed: Aug. 5, 2024

(65) Prior Publication Data

US 2024/0392922 A1 Nov. 28, 2024

Related U.S. Application Data

(63) Continuation of application No. 18/357,685, filed on Jul. 24, 2023, now Pat. No. 12,055,271, which is a
(Continued)

(51) Int. Cl.
*F17C 3/12* (2006.01)
*F17C 11/00* (2006.01)
*F17C 13/08* (2006.01)

(52) U.S. Cl.
CPC ............... *F17C 3/12* (2013.01); *F17C 11/00* (2013.01); *F17C 13/083* (2013.01);
(Continued)

(58) Field of Classification Search
CPC ......... F17C 3/12; F17C 11/00; F17C 13/083; F17C 2201/0157; F17C 2201/035; F17C 2201/054; F17C 2203/0604; F17C 2203/0621; F17C 2203/0636; F17C 2203/0639; F17C 2203/0643; F17C 2203/0648; F17C 2203/066; F17C 2205/0161; F17C 2221/037; F17C 2223/0123; F17C 2223/035; F17C 2260/036; F17C 2260/038; F17C 2260/053; F17C 2273/0171; F17C 2273/05

See application file for complete search history.

(56) References Cited

U.S. PATENT DOCUMENTS 1,767,641 A 6/1930 Anschicks
1,866,902 A 7/1932 Overmire
(Continued)

OTHER PUBLICATIONS

"Rhino Linings," Frac Tank Rentals, Retrieved from the Internet: http://www.fractankrentals.com/tanks.html, May 20, 2013.
(Continued)

*Primary Examiner* — Patrick C Williams
(74) *Attorney, Agent, or Firm* — Dunlap Codding, P.C.

(57) ABSTRACT

A storage tank includes a frame, tank assembly, and scrubber system. The tank assembly including a vessel supported by the frame and having a first end, a second end, and a sidewall extending from the first end to the second end. The vessel further has a top, a bottom, at least one side, an internal surface, and an outlet fluidly coupled with the bottom. A scrubber tank is supported by the frame and fluidly connected to the top of the vessel to receive vapors from the vessel in a way that when a vapor absorption material is disposed in the scrubber tank, the vapors pass into the vapor absorption material.

16 Claims, 8 Drawing Sheets

Related U.S. Application Data continuation of application No. 17/213,516, filed on Mar. 26, 2021, now Pat. No. 11,708,941, which is a continuation of application No. 15/903,960, filed on Feb. 23, 2018, now Pat. No. 10,962,172.

(60) Provisional application No. 62/463,161, filed on Feb. 24, 2017.

(52) U.S. Cl.
CPC ............ *F17C 2201/0157* (2013.01); *F17C 2201/035* (2013.01); *F17C 2201/054* (2013.01); *F17C 2203/0604* (2013.01); *F17C 2203/0621* (2013.01); *F17C 2203/0636* (2013.01); *F17C 2203/0639* (2013.01); *F17C 2203/0643* (2013.01); *F17C 2203/0648* (2013.01); *F17C 2203/066* (2013.01); *F17C 2205/0161* (2013.01); *F17C 2221/037* (2013.01); *F17C 2223/0123* (2013.01); *F17C 2223/035* (2013.01); *F17C 2260/036* (2013.01); *F17C 2260/038* (2013.01); *F17C 2260/053* (2013.01); *F17C 2270/0171* (2013.01); *F17C 2270/05* (2013.01)

(56) References Cited

U.S. PATENT DOCUMENTS

| | | |
|---|---|---|
| 2,056,179 A | 10/1936 | Fitch |
| 2,323,458 A | 7/1943 | Dunn |
| 3,172,566 A | 3/1965 | Mullin et al. |
| 3,372,693 A | 3/1968 | Gutzeit |
| 3,656,657 A | 4/1972 | Smith et al. |
| 3,726,431 A | 4/1973 | Botkin |
| 3,860,018 A | 1/1975 | Reiter |
| 3,907,162 A | 9/1975 | Maxfield |
| 4,406,471 A | 9/1983 | Holloway |
| 4,589,565 A | 5/1986 | Spivey |
| 4,673,102 A | 6/1987 | Bullock, Jr. |
| 5,071,166 A | 12/1991 | Marino |
| 5,232,246 A | 8/1993 | Page |
| 5,242,196 A | 9/1993 | Borne |
| 5,301,980 A | 4/1994 | Dingle |
| 5,353,967 A | 10/1994 | Toth et al. |
| 5,582,311 A | 12/1996 | Bartenstein et al. |
| 5,634,962 A | 6/1997 | Trahan et al. |
| 5,782,493 A | 7/1998 | Bolton et al. |
| 5,863,316 A | 1/1999 | Lordo et al. |
| 5,938,065 A | 8/1999 | De Vivo et al. |
| 6,152,492 A | 11/2000 | Markham et al. |
| 6,173,991 B1 | 1/2001 | Piona et al. |
| 6,328,064 B1 | 12/2001 | Garfield |
| 6,375,222 B1 | 4/2002 | Wade |
| 6,382,446 B1 | 5/2002 | Hinkle et al. |
| 7,815,222 B2 | 10/2010 | Markham |
| 7,837,050 B2 | 11/2010 | Maybury, Jr. |
| 7,997,441 B2 | 8/2011 | Marcel |
| 8,016,322 B2 | 9/2011 | Keehan et al. |
| 8,672,173 B2 | 3/2014 | Hall et al. |
| 8,931,510 B2 | 1/2015 | Gaertner et al. |
| 9,283,883 B2 | 3/2016 | Vaughn |
| 2010/0147860 A1 | 6/2010 | McKenzie |
| 2011/0266289 A1 | 11/2011 | Riviezzo et al. |
| 2011/0309076 A1 | 12/2011 | Liebenberg et al. |
| 2014/0367953 A1* | 12/2014 | Vaughn ............... B65D 88/128 220/601 |
| 2015/0159809 A1 | 6/2015 | Goad |
| 2016/0018059 A1 | 1/2016 | Stockhem et al. |

OTHER PUBLICATIONS

"Custom Built Frac Tank with Sloped Floor for Draining Heavy and Sand Filled Products," Burch Tank & Truck Inc, Retrieved from the Internet: http://burchtank.com/photo gallery, May 20, 2013.

\* cited by examiner

STORAGE TANK

CROSS-REFERENCE TO RELATED APPLICATION

This application is a continuation of U.S. Ser. No. 18/357,685, filed Jul. 24, 2023, which is a continuation of U.S. Ser. No. 17/213,516, filed Mar. 26, 2021, now U.S. Pat. No. 11,708,941, which is a continuation of U.S. Ser. No. 15/903,960, filed Feb. 23, 2018, now U.S. Pat. No. 10,962,172, which claims priority to U.S. Provisional Application Ser. No. 62/463,161, filed on Feb. 24, 2017; the entire contents of each being hereby expressly incorporated herein by reference.

BACKGROUND

Storage tanks are widely used to transport and store many chemicals, solutions, or substances, such as water, liquids, fuels, fluids, and pressurized gases including corrosive or caustic (e.g., acidic or alkaline) chemicals, mixtures, or solutions. Storage tanks may be stationary, such as by being provided with a support or by being placed on the surface of the ground or partially or fully underground, or may be movable, such as by being mounted on a truck, trailer, movable skid, ship, or other movable platform or vehicle. Multiple industries utilize storage tanks for temporary or permanent storage and transport of many chemicals or substances used in many industrial, agricultural, and oil and gas operations.

Some industries, such as the oil and gas industry, utilize multiple storage and transport tanks in the field, such as chemical storage tanks, condensate tanks, separator tanks, and frac tanks. These tanks are usually transported over rough, muddy, and uneven terrain, and are frequently left at wells sites for extended periods of time. The tanks are exposed to the detrimental and corrosive effects of both the environmental conditions and the chemicals or solutions they store.

For example, transporting existing storage tanks over rough terrain often causes damage to the tanks or to the tank trailers or supports, as existing movable storage tanks and tank supports have generally low ground clearances, and are prone to impacting, contacting, or dragging against rocks, bumps, or other terrain features as they are moved in the field. Further, because existing storage tanks are relatively heavy (especially when full), existing storage tanks get stuck in muddy or rough terrain, to where some prior art storage tanks include reinforced portions and tow hooks to allow them to be pushed, pulled, or otherwise extracted from the mud.

Another disadvantage of existing storage tanks is that they are positioned directly in contact with the ground when in use, which exposes them to moisture, and/or mud and causes them to gradually corrode and leak. Leaks often develop on the portions of the storage tanks which are not visible (e.g., the bottom or underside), which makes visually detecting leaks difficult or practically impossible. Sometimes, a leak may go undetected for a long period causing a large amount of the substance stored in the storage tank to leak into the ground or otherwise pollute the wellsite and expose oilfield personnel to hazardous chemicals or substances. This problem is further exacerbated by the fact that storage tanks are frequently used to store corrosive chemicals, such as alkaline or acidic chemicals or solutions. Such chemical storage tanks are subjected to the dual action of external corrosive effects from the environment and internal corrosive effects from the chemicals stored in the tank, which leads to short life spans and to frequent field failures of existing chemical storage tanks.

BRIEF DESCRIPTION OF THE DRAWINGS

Like reference numerals in the figures represent and refer to the same or similar element or function. Implementations of the inventive concepts disclosed may be better understood when consideration is given to this detailed description thereof. Such description references to the annexed pictorial illustrations, schematics, graphs, drawings, and appendices. In the drawings.

DETAILED DESCRIPTION OF EXEMPLARY EMBODIMENTS

Figure 1:
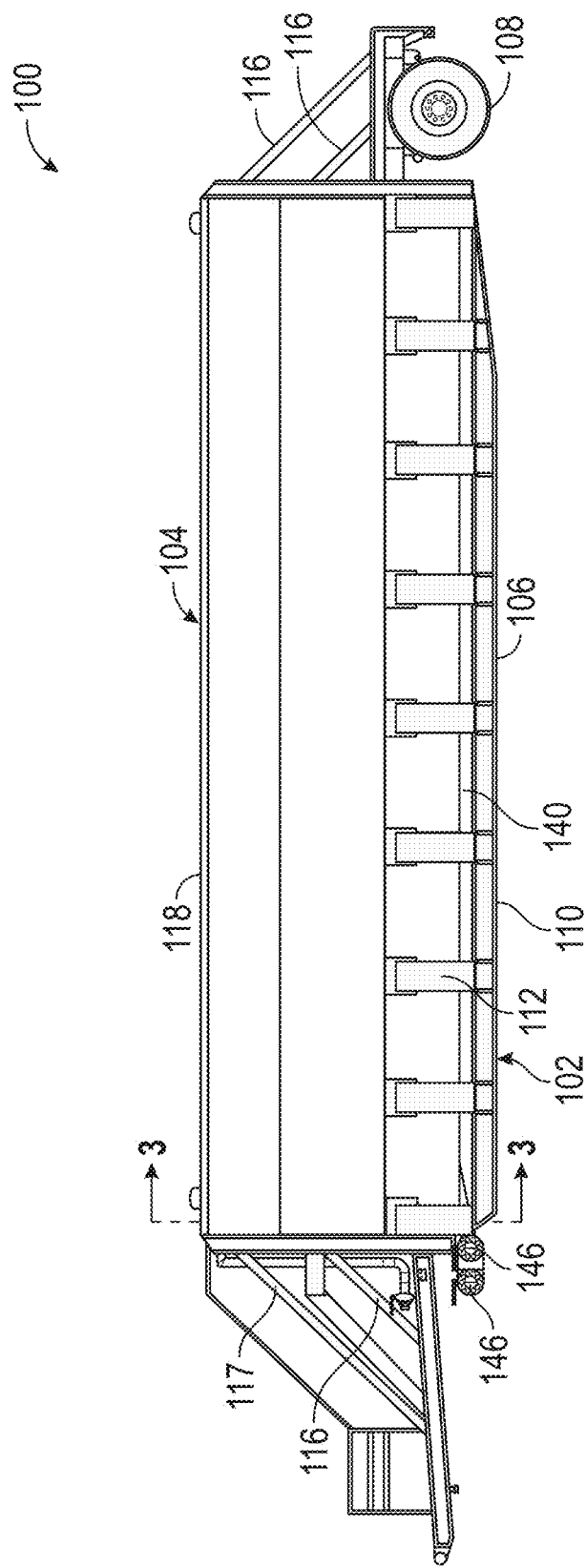
FIG. 1 is a side elevational view of an exemplary embodiment of a storage tank constructed in accordance with the inventive concepts disclosed.

Before explaining at least one embodiment of the inventive concepts disclosed, it is to be understood that the inventive concepts are not limited in their application to the details of construction and the arrangement of the components or steps or methodologies in the following description or illustrated in the drawings. The inventive concepts disclosed are capable of other embodiments or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described to avoid unnecessarily complicating the disclosure.

Further, unless stated to the contrary, "or" refers to an inclusive "or" and not to an exclusive "or." For example, a condition A or B is satisfied by anyone of: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts disclosed. This description should be read to include one or at least one and the singular also includes the plural unless it is obvious that it is meant otherwise.

As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

The inventive concepts disclosed are generally directed to storage tanks, and more particularly but not by way of limitation to a storage tank configured to be easily movable and to be leak and corrosion resistant.

Storage tanks according to the inventive concepts disclosed may be polygonal (e.g., hexagonal, heptagonal, octagonal) in shape, and may include a support frame which may have wheels or may be otherwise configured to move the storage tank. In some exemplary embodiments, the frame may be configured so the storage tank is elevated from the ground to protect the exterior of the storage tank from corrosion and to protect the storage tank from damage while the storage tank is being moved over rough terrain. Further, the frame is configured to support the storage tank so that substantially all of the welds, sides, and/or surfaces of the storage tank are visible or otherwise observable to detect leaks, corrosion, or other damage. Further, storage tanks according to the inventive concepts disclosed may be internally lined with a chemical resistant or substantially chemical-proof lining (e.g., acid-resistant or acid-proof) to protect the interior of the storage tank from corrosion. The lining may be substantially flexible for enhanced durability and to prevent the lining from cracking or breaking as the storage tank is moved or exposed to environmental conditions or temperature cycles in the field.

Storage tanks according to the inventive concepts disclosed may have an outlet which may be substantially level with a bottom (e.g., a slanted bottom) of the storage tank to ensure substantially complete drainage of fluids from the storage tank. Further, storage tanks according to the inventive concepts disclosed may include a corrosion-resistant wash line (e.g., constructed of a polymer) positioned inside the storage tank at the top to wash down the interior of the storage tank. The wash line may have polymer or other types of attachments to the storage tank and metal attachments may be avoided to further minimize the chances of corrosion. The wash line may have a plurality of openings and may be configured to jet or emit water or other wash or flush fluid onto the top and/or sides of the interior of the storage tank to wash the interior of the storage tank. In some exemplary embodiments, a corrosion-resistant (e.g., polymer) recirculation line may be provided (e.g., externally to the storage tank) and may extend through the tank wall in at least one location or in two or more locations to recirculate the chemical stored in the tank (e.g., by being connected to a recirculation pump). Further, a lined gauging well including a corrosion-resistant (e.g., polymer) liner and a reinforced bottom may be implemented to protect the internal coating of the storage tank during gauging operations.

As appreciated by persons of ordinary skill in the art, storage tanks according to the inventive concepts disclosed are configured to be substantially leak-resistant and corrosion-resistant and to be easily movable over rough or uneven terrain, while all or substantially all external surfaces (or the majority thereof) of the storage tanks can be inspected in the field for leaks, damage, and/or corrosion.

Figure 2:
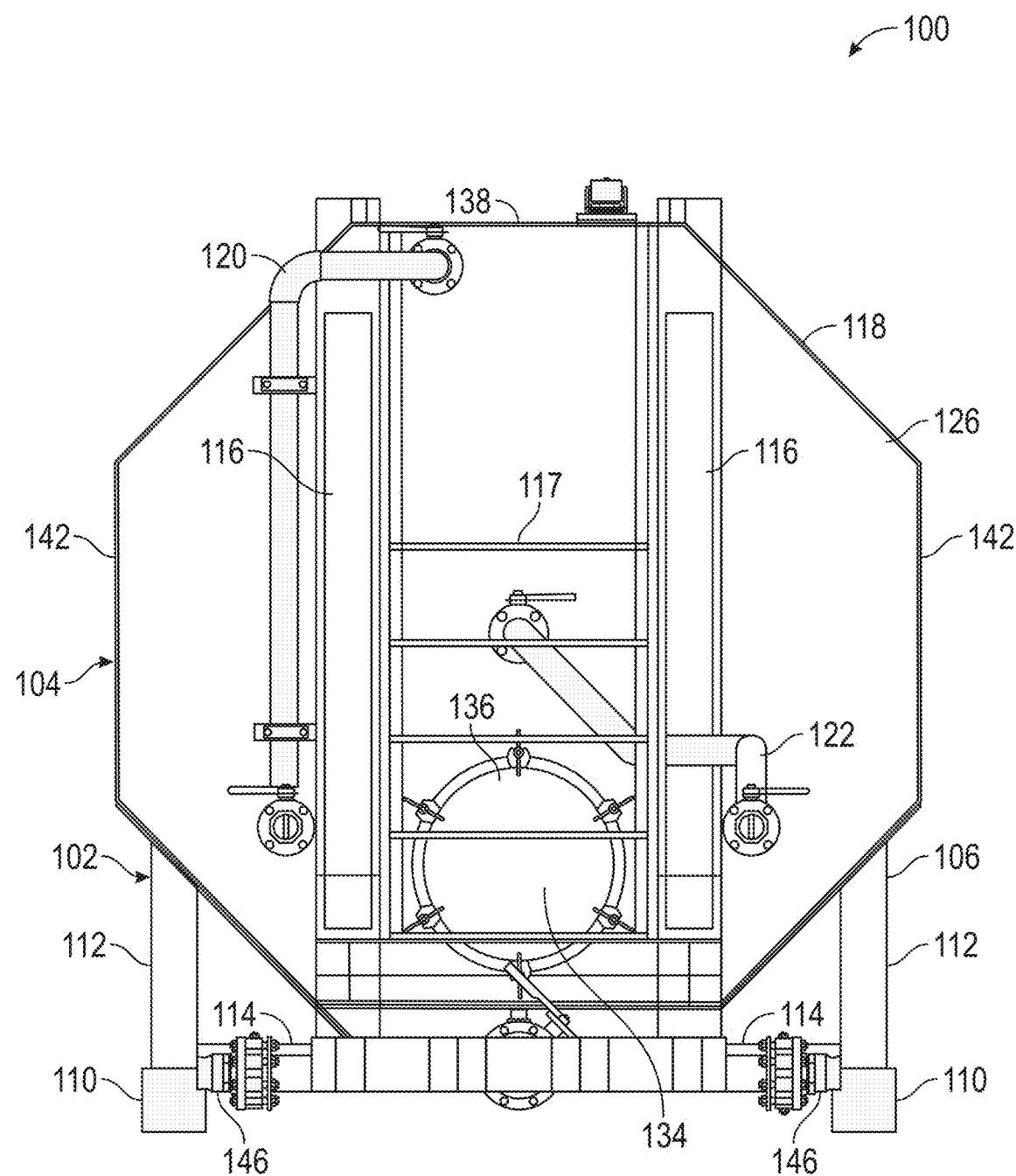
FIG. 2 is a front elevational view of the storage tank of FIG. 1.
Figure 3:
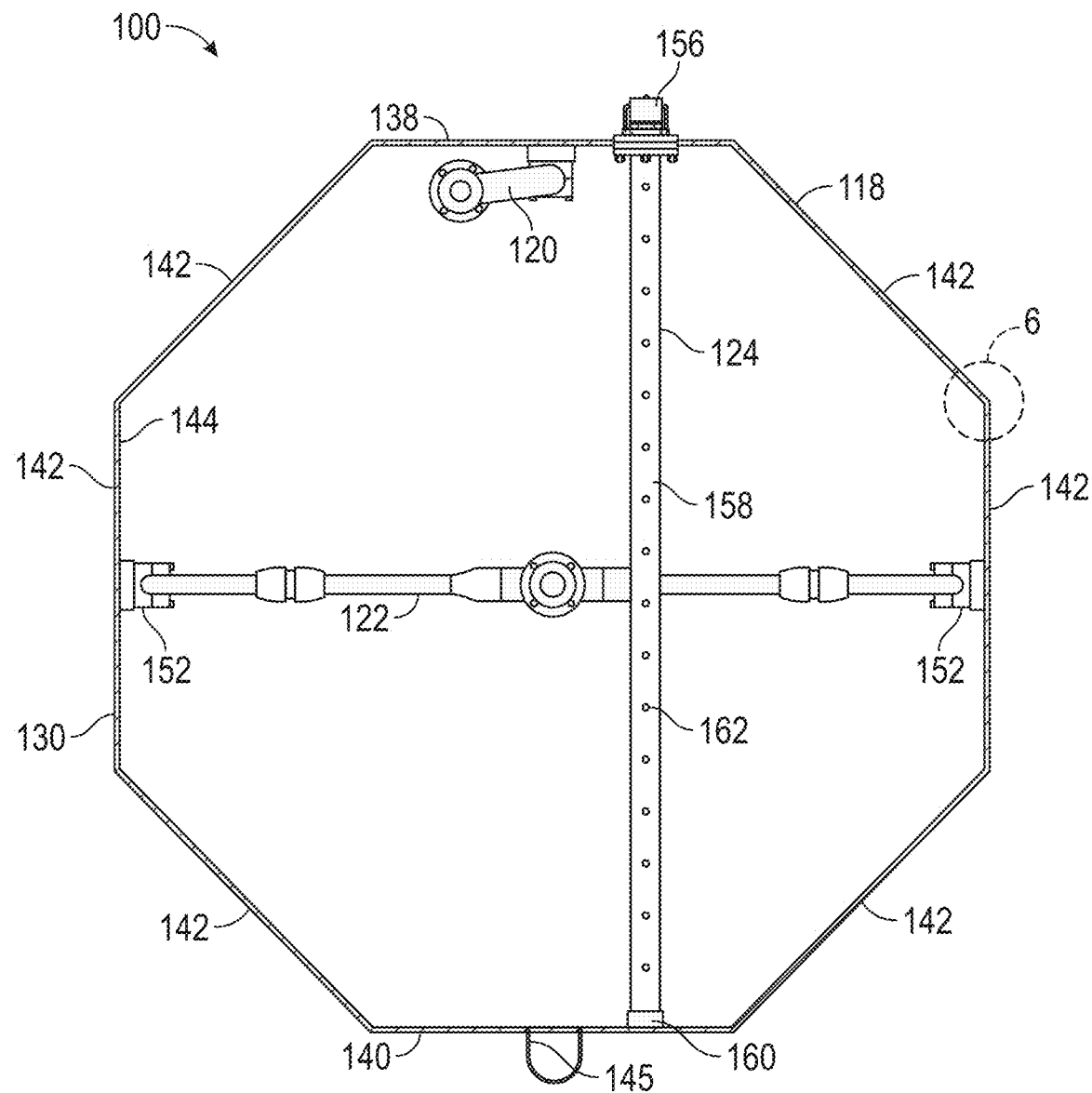
FIG. 3 is a sectional view taken along line 3-3 of FIG. 1 shown with a frame removed.

Referring now to the drawings, and to FIGS. 1-3 in particular, shown is an exemplary embodiment of a storage tank 100 constructed in accordance with the inventive concepts disclosed. The storage tank 100 includes a support assembly 102 and a tank assembly 104 supported by the support assembly 102.

The support assembly 102 includes a frame 106 and at least one wheel 108 associated with the frame 106. The frame 106 includes a pair of horizontal support members 110, a plurality of vertical support members 112 extending upwardly from each of the horizontal support member 110, a plurality of transverse support members 114 extending between the horizontal support member 110, and a plurality of bracing members 116. The horizontal support members 110, vertical support members 112, transverse support members 114, and bracing members 116 may be constructed of any desired material, such as metals, alloys, steel, non-metals, polymers, plastics, and combinations thereof, and may be associated with one another in any desired manner, such as via welds, seams, joints, shims, brackets, bolts, screws, adhesives, and combinations thereof. It is to be understood that any number of horizontal support members 110 (e.g., at least one, one or more, or two or more horizontal support members 110), vertical support members 112 (e.g., at least one, one or more, or two or more vertical support members 112), the transverse support members 114 (e.g., at least one, one or more, or two or more transverse support members 114), and bracing members 116 (e.g., at least one, one or more, or two or more bracing members 116) may be implemented with the inventive concepts disclosed. Further, in some exemplary embodiments, the horizontal support members 110, the vertical support members 112, the transverse support members 114, and the bracing members 116 may be formed as a unitary component.

The frame 106 is configured to support the tank assembly 104 at a sufficient ground clearance to allow moving the storage tank 100 over rough or uneven terrain, and to protect the tank assembly 104 from coming into contact with the surface as the storage tank 100 is moved over portions of the surface which include rough or uneven terrain, curbs, ditches, rocks, or other similar features that may contact or damage the tank assembly 104. Further, when the storage tank 100 is placed at a desired location (e.g., at a wellsite), the frame 106 supports the tank assembly 104 a distance above the surface to protect the tank assembly 104 from moisture, mud, dirt, and the corrosive effects associated therewith, while the tank assembly 104 is subjected to the precipitation and heat cycles of the particular location of the storage tank 100.

The frame 106 is also configured to support the tank assembly 104 so substantially all sides and/or surfaces of the tank assembly 104 are visually observable to detect any leaks, damage, and/or corrosion to which the tank assembly 104 may be subject to in the field. For example, when the storage tank 100 is used in the field, a portion of the frame 106 may be in contact with the surface (e.g., the horizontal support members 110 and/or the transverse support members 114), so the tank assembly 104 is supported at a distance above the surface (e.g., by the vertical support members 112 and/or the bracing members 116). As appreciated by persons of ordinary skill in the art having the benefit of the disclosure, this configuration of the horizontal support members 110, the transverse support members 114, the vertical support members 112, and the bracing members 116 allows substantially all surfaces and/or sides of the tank assembly 104 to be visually observable (to detect leaks, rust, corrosion, or damage).

In some exemplary embodiments, the frame 106 may be configured to support the tank assembly 104 at an angle relative to the surface to ensure substantially complete drainage of fluids from the tank assembly 104 as described below.

The wheel 108 may be rotatably associated with the frame 106 in any desired manner and may be configured to move the support assembly 102 and/or the storage tank 100 over a surface (e.g., the ground), such as the surface, for example. It is to be understood that any number of wheels 108 may be implemented with the inventive concepts disclosed, while in some exemplary embodiments the wheel 108 may be omitted. Further, while the wheel 108 is described as configured to move the support assembly 102 and/or the storage tank 100 over a surface, such surface may be a railroad, and the wheel 108 may be a train wheel. An end of the frame 106 may be configured to allow the frame 106 to be attached to any suitable motive power source configured to move the storage tank 100, such as a truck, a trailer, a railroad engine, and any other desired vehicle or motive power source, as appreciated by persons of ordinary skill in the art having the benefit of the disclosure.

The support assembly 102 may also include a ladder 117 configured to allow a user or worker to reach the top and/or interior of the tank assembly 104 as described below. In some exemplary embodiments, the ladder 117 may be omitted.

Referring now to FIGS. 1-6, the tank assembly 104 includes a vessel 118, a recirculation line 120, a wash line 122, and a gauging well 124. The vessel 118 includes a first end 126, a second end 128, a sidewall 130 extending between the first end 126 and the second end 128, and a lining 132 associated with the sidewall 130. The first end 126, the second end 128, and the sidewall 130 may be associated with one another in any desired fluidly-impermeable manner (e.g., via welds, joints, or seams) to form the vessel 118. In some exemplary embodiments, the first end 126, the second end 128, and the sidewall 130 may be formed as a unitary component. The vessel 118 may have any desired capacity, such as 16,000 gallons, for example, and may be sized within any department of transportation regulations or other applicable regulations, so as not to require a special permit to move the storage tank 100 over public roads, as appreciated by a person of ordinary skill in the art having the benefit of the disclosure.

The first end 126 can be constructed of any desired material, such as metals, alloys, non-metals, polymers, plastics, and combinations thereof, for example. The first end 126 may be associated with or connected with the bracing members 116 as shown in FIGS. 1-3. The first end 126 may include an opening or manway 134 (FIG. 2) formed and sized and configured to allow a user or a worker to visually and physically inspect the interior of the vessel 118. The manway 134 may include a lid 136 which may be selectively associated with the first end 126 in a substantially fluid-impermeable manner, such as via one or more gaskets or seals, for example. The manway 134 may have any desired size (e.g., about 18 inches), provided that the manway 134 allows for visual and physical inspection of the interior of the vessel 118, for example.

Figure 6:
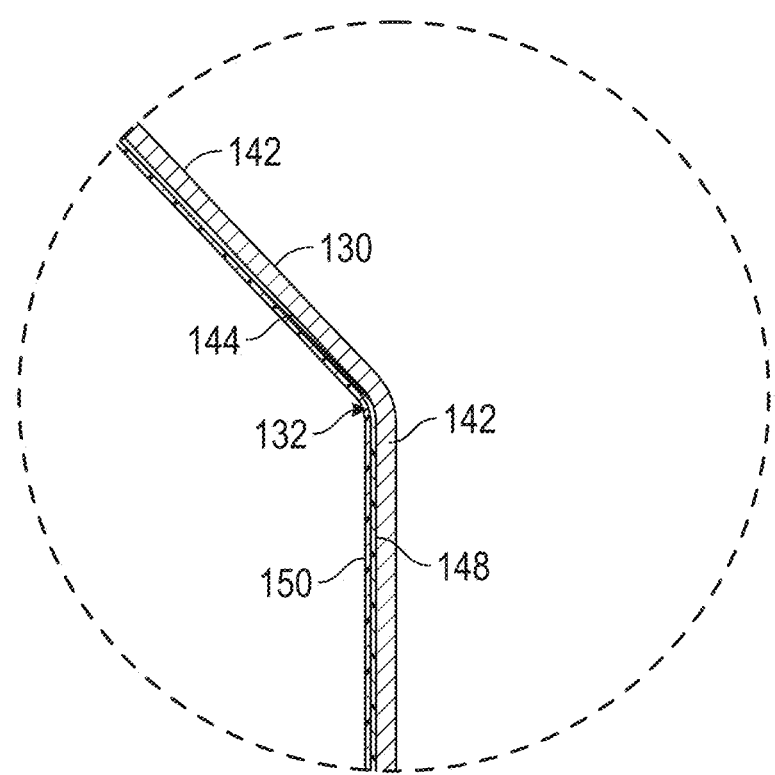
FIG. 6 is a detail view taken along circle 6-6 of FIG. 3.

The second end 128 may be implemented and may function similarly to the first end 126. The second end 128 may be associated with or connected with the bracing members 116 as shown in FIGS. 1 and 6.

The sidewall 130 includes a top 138, a bottom 140, one or more sides 142, and an internal surface 144. The bottom 140 may be supported by the frame 106 by being connected, supported by, or otherwise associated with at least one of the transverse support members 114. The sides 142 may likewise be supported by the frame 106 by being connected or otherwise associated with the vertical support members 112, as shown in FIGS. 1 and 2.

The sidewall 130 may be constructed of any desired material, such as metals, alloys, steel, stainless steel, non-metals, plastics, polymers, and combinations thereof. The sidewall 130 may have any desired shape, such as polygonal, pentagonal, hexagonal, heptagonal, or octagonal, for example. In some exemplary embodiments, the sidewall 130 may have at least a portion having a round, circular, or oval shape. For example, where the sidewall 130 is implemented as an octagonal sidewall 130, the sidewall 130 may include a top 138, a bottom 140, and six sides 142, as appreciated by persons of ordinary skill in the art having the benefit of the disclosure. It is to be understood that the sidewall 130 may have any desired number of sides 142, such as two, three, four, five, six, seven, eight, or more, in some exemplary embodiments of the inventive concepts disclosed. Further, in some exemplary embodiments, the top 138, the bottom 140, and the sides 142 may be associated with one another in any desired fluidly-impermeable manner, and in some exemplary embodiments, two or more, or all of the top 138, the bottom 140, and the sides 142 may be formed as a unitary component.

In one embodiment, the sidewall 130 can be implemented as a modified octagonal sidewall wherein the top, bottom, and vertical sides of the octagon are larger than the remaining four diagonal sides. The modified octagonal sidewall creates an increased storage tank volume compared to the octagonal side wall 130 with eight equally sized sides. For example, the top and bottom sides of an equilateral octagonal sidewall are increased from about 40 inches to about 60 inches, the vertical sides are increased to about 66 inches, and the diagonal sides are decreased to about 29 inches. By additionally increasing the fluid containment portion of the storage tank 100 from 36 ft. to 38 ft., the overall tank capacity can be increased from 380 BBL to 470 BBL.

Further, the bottom 140 may angle toward a trough 145 (FIG. 3) to ensure substantially complete draining of the vessel 118. An outlet 146 may be fluidly coupled with the vessel 118 at the bottom 140 (e.g., adjacent to the first end 126 of the vessel 118), and may be configured to substantially empty or drain the contents of the vessel 118. The outlet 146 may be implemented as a manifold with a plurality of outlets 146 extending to the sides of the storage tank 100. The outlets 146 may be formed of a chemical-resistant and/or corrosion-resistant material, such as polymers, plastics, resins, and combinations thereof, for example. The outlets 146 may be oriented in different directions. For example, one of the outlets 146 may extend to the side and one of the outlets 146 may extend forward. In some exemplary embodiments, the vessel 118 may be supported by the frame 106 so the first end 126 of the vessel 118 is supported at a first distance above the surface and the second end 128 is supported at a second distance above the surface, with the first distance being less than the second distance (e.g., by about 2 inches) to ensure complete drainage of the vessel 118 via the outlet 146.

Referring to FIG. 6, the lining 132 may be associated with the internal surface 144 of the sidewall 130 and with the respective internal surfaces of the first end 126 and the second end 128 so that a substantially fluid-impermeable lining 132 is formed inside the vessel 118. In some exemplary embodiments, the lining 132 may be constructed of a flexible or substantially flexible polymer material, such as a plasticized gypsum material (e.g., the material described in U.S. Pat. No. 5,344,490, the entire disclosure of which is hereby incorporated herein by reference), and/or the polymer materials sold by Castagra Products, Inc. as FracShield and Ecodur, or any other desired chemical-proof, or chemical-resistant material that is desirably substantially flexible. As shown in FIG. 6, the lining 132 may include one or more, or two or more layers in some exemplary embodiments. For example, the lining 132 may include a base layer 148 having a thickness of about 20 mm and a top layer 150 having a thickness of about 20 mm, to provide a flexible chemical-resistant lining 132 having a thickness of about 40 mm. It is to be understood that the lining 132 may be implemented with any number of layers 148 and/or 150 (including a single layer) and may have any desired thickness. Further, in some exemplary embodiments, the layer 148 and the layer 150 may be constructed of the same, similar, or different materials, as appreciated by persons of ordinary skill in the art having the benefit of the disclosure. The lining 132 may be acid-resistant or substantially acid-proof in some exemplary embodiments.

The recirculation line 120 may be implemented as any desired conduit or line configured to allow a volume of fluids to flow therethrough. In one embodiment, the recirculation line 120 extends from the first end 126 toward the second end 128 near the top 138 of the vessel. The recirculation line 120 has an open distal end angled to promote circulation of the liquid contents of the vessel 118. The recirculation line 120 may be constructed of any desired material, such as polymers, plastics, ceramics, metals, non-metals, and any other desired corrosion-resistant and/or chemical-resistant materials, depending on the particular chemicals expected to be stored in the tank assembly 104. The recirculation line 120 can extend through the sidewall 130 at any desired location between the first end 126 and the second end 128 of the vessel 118. In some exemplary embodiments, the recirculation line 120 can be fluidly coupled with the vessel 118 by extending through the first end 126 and/or the second end 128, as appreciated by persons of ordinary skill in the art having the benefit of the disclosure. Further, in some exemplary embodiments, the recirculation line 120 may be omitted.

The wash line 122 may be implemented similarly to the recirculation line 120 and may be mounted at least partially inside the vessel 118 (e.g., below the top 138 of the sidewall 130) and has one or more connectors 152 (FIGS. 3 and 4) and one or more wash nozzles 154 (FIG. 4) configured to direct a volume of fluid towards the top 138 of the sidewall 130 and outwards towards the sides 142 of the sidewall 130 to wash the interior of the vessel 118. In one embodiment, the wash line 122 includes a pair of conduits extending substantially the length of the vessel 118 in a spaced apart, parallel relationship to one another. The one or more connectors 152 are configured to associate the wash line 122 with the internal surface 144 of the sidewall 130, for example, by being connected to the top 138 of the sidewall 130 and/or to the lining 132 in any desired manner. The one or more connectors 152 may be constructed of any suitable material, and are desirably constructed of a corrosion-resistant material such as polymers, plastics, resins, or combinations thereof.

The wash line 122 may flush the vessel 118 between uses to wash, flush, or otherwise remove chemicals and or residues from the vessel 118. The wash line 122 may extend through the sidewall 130 at the top 138 or the sidewall 130 and/or adjacent to the first end 126 of the vessel 118. In some exemplary embodiments, the wash line 122 may extend through the sidewall 130 at any desired location, or may extend through the first end 126 and/or through the second end 128. Further, in some exemplary embodiments, the wash line 122 may be omitted, or more than one wash line 122 may be implemented.

Figure 4:
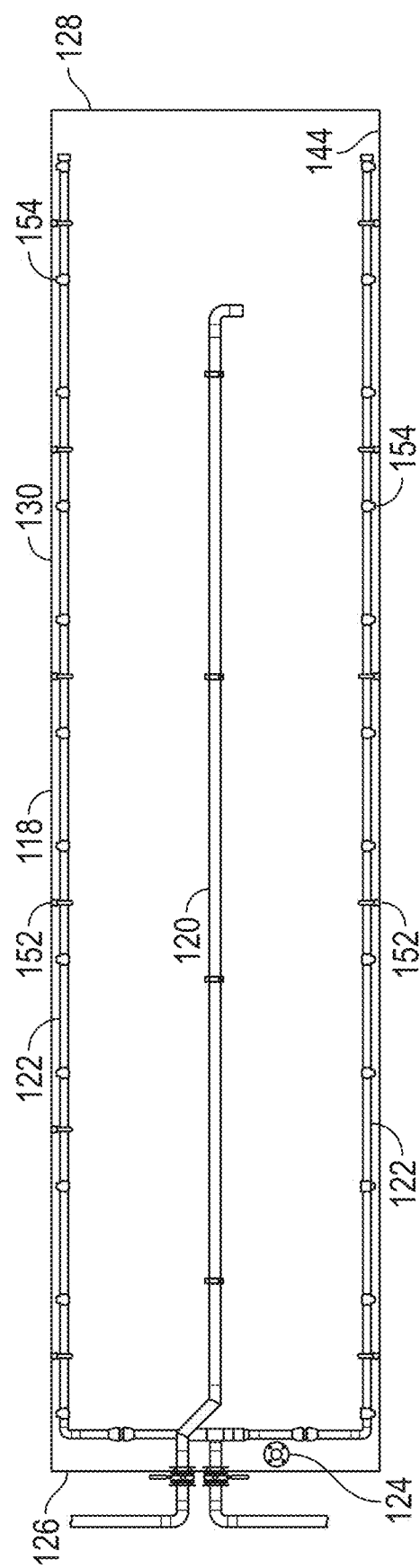
FIG. 4 is a top plan view of a vessel with a top portion cutaway partially cutaway, rear elevational view.
Figure 5:
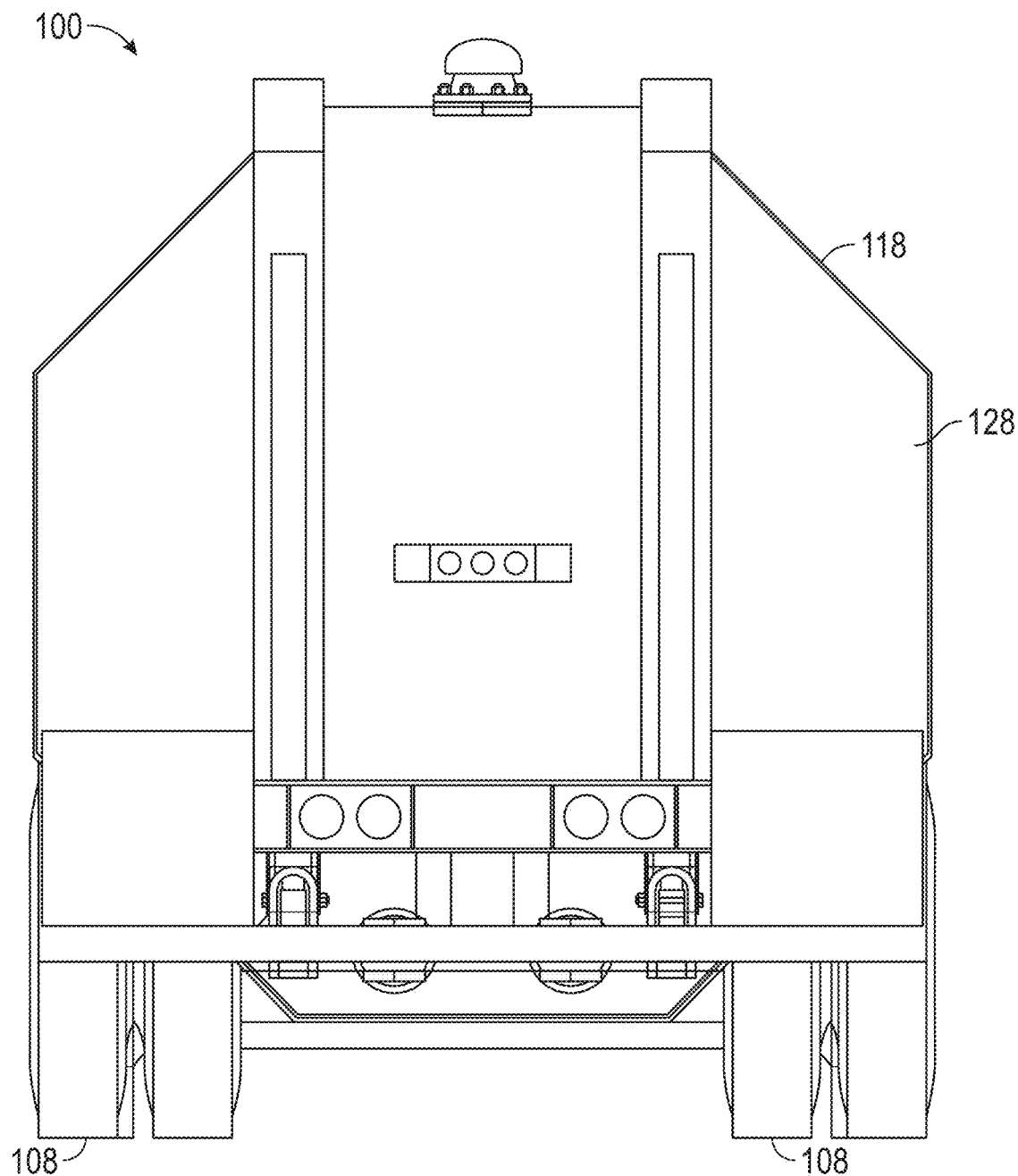
FIG. 5 is a rear elevational view of the storage tank.

The gauging well 124 includes a well opening 156 formed in the sidewall 130, and a conduit 158 having reinforced end 160 (FIGS. 3-4). The gauging well 124 is configured to allow for gauging of the level of fluids inside the vessel 118, while protecting the lining 132 of the vessel 118 from gauge stick impacts, cracks, or other gauging device damage when the level of fluids inside the vessel 118 is measured.

The well opening 156 is positioned at the top of the sidewall 130 and may be positioned at any desired location along the sidewall 130 between the first end 126 and the second end 128 (e.g., adjacent to the first end 126). The well opening 156 may be selective closeable via any suitable lid, for example.

The conduit 158 may extend into the interior of the vessel 118, from the top 138 of the sidewall 130, substantially towards the bottom 140 of the sidewall 130 (e.g., at least partially or substantially spanning the distance between the top 138 and the bottom 140), and may be constructed from any desired corrosion-resistant or chemical-resistant material, such as plastics, polymers, resins, and combinations thereof. The conduit 158 may include one or more or a plurality of perforations 162 formed so the conduit 158 is fluidly coupled with the interior of the vessel 118, to enable a user to measure the level of fluids inside the vessel 118 be measuring the level of fluids inside the conduit 158, for example.

The reinforced end 160 may be associated with the conduit 158 in any desired manner and may be configured to protect the lining 132 from being impacted by a gauging tool inserted into the gauging well 124. The reinforced end 160 may be constructed of similar materials as the conduit 158, for example.

It is to be understood that in some exemplary embodiments, the reinforced end 160, the perforations 162, and/or the gauging well 124 may be omitted.

In operation, the storage tank 100 may be transported to any desired location (e.g., a wellsite, a factory), by a selected vehicle, such as a truck. Once at the desired location, the storage tank 100 may be secured in place in any desired manner. A source of wash fluids may be fluidly connected with the wash line 122. A suitable recirculation pump may be operably and fluidly connected with the recirculation line 120. A separate storage vessel, a fluid conduit, a pump, or any other desired conduit, vessel, or device, may be fluidly coupled with the outlet 146. As appreciated by persons of ordinary skill in the art having the benefit of the disclosure, any desired volume of chemicals such as acids, bases, or any other desired chemicals, substances, or solutions, may be stored in the storage tank 100. A portion of any liquids or fluids stored in the storage tank may be recirculated via the recirculation line 120, or may be removed from the storage tank 100 via the outlet 146 for use as desired. The outlet 146 cooperates with the bottom 140 to ensure substantially complete drainage of fluids from the vessel 118.

During use of the storage tank 100, a user may check or gauge the level of chemical stored within the vessel 118, by climbing the ladder 117, accessing the well opening 156 of the gauging well 124, and by inserting a gauging stick, float, or other suitable device in the gauging well 124 to measure the level of fluids inside the vessel 118. The reinforced end 160 of the gauging well 124 protects the lining 132 of the vessel 118 if the user drops or forcefully inserts the gauging device into the gauging well 124.

Figure 7A:
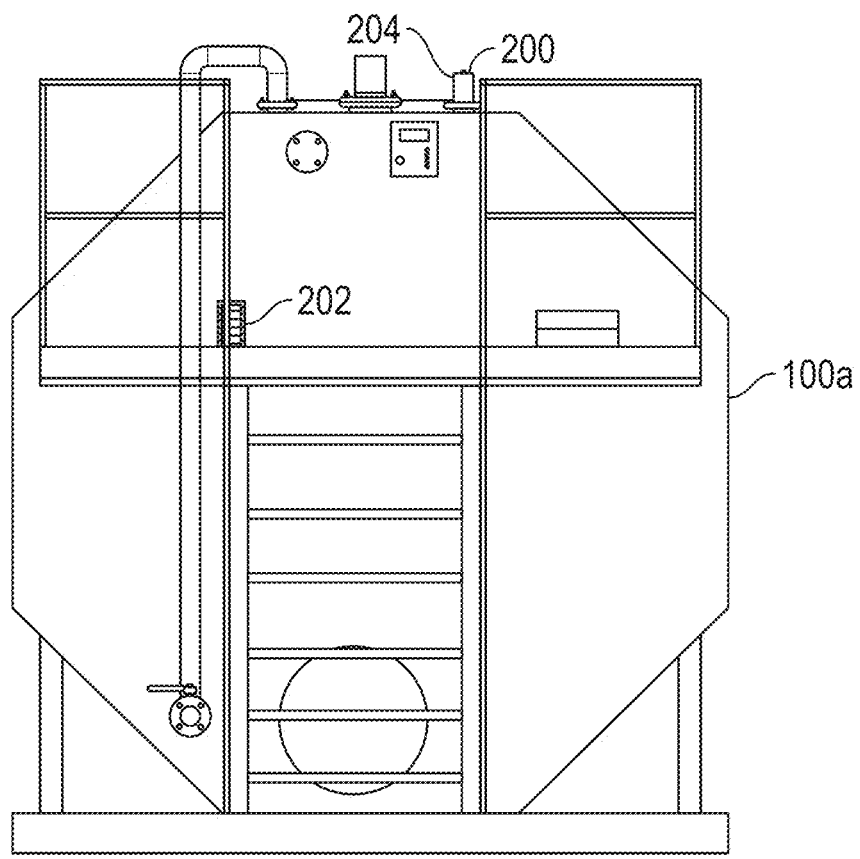
FIG. 7A is a rear elevational view of another embodiment of a storage tank showing an electronic level monitoring device.
Figure 7B:
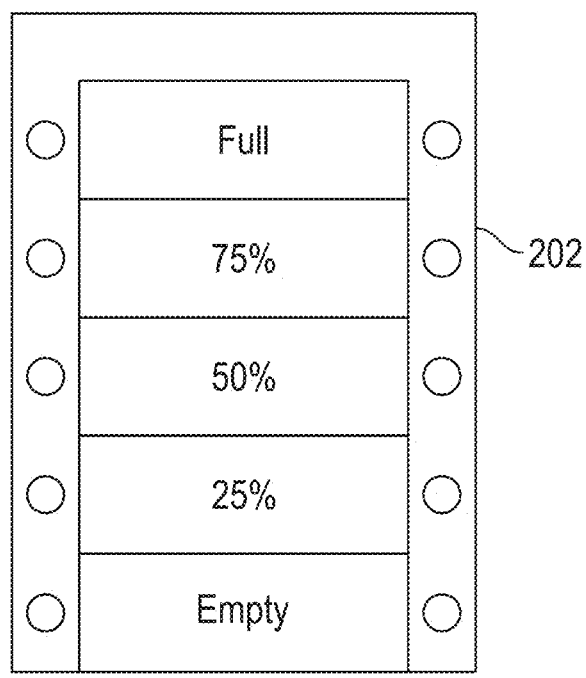
FIG. 7B is an elevational view of a light assembly used with the electronic level monitoring device.

Referring to FIG. 7, an electronic level monitoring device 200 is mounted to a storage tank 100a, which is similar to the storage tank 100, to measure the level of the fluid in the storage tank 100a. When the storage tank 100a contains an acidic or hazardous fluid, the ability to maintain a seal while still measuring the fluid level can eliminate a source of fumes to the local atmosphere. It also eliminates safety concerns associated with manual measurement of the acidic or hazardous fluid level.

A light assembly 202, mounted on the storage tank 100a, can be connected to the electronic level monitoring device 200 to provide a visual indication of the fluid level in the storage tank 100a.

In one embodiment, the digital level monitoring device 200 measures the distance between the liquid level and a reference point at a sensor or transmitter 204 at the top of the storage tank 100a. A pulse wave is generated at the reference point 204, which travels through the vapor space, reflects off the liquid surface, and returns to a pickup at the reference point 204. An electronic timing circuit measures the total travel time which allows calculation of the distance to the surface of the fluid. The pulse can be light, ultrasound, microwaves.

To wash the interior of the vessel 118, a volume of wash or cleaning fluid may be introduced into the vessel 118 via the wash line 122 so the volume of wash fluid flows over the top 138, sides 142, and bottom 140 of the internal surface 144 of the sidewall 130 and over the internal surfaces of the first end 126 and the second and 128, to substantially wash or flush the interior of the vessel 118. The volume of wash fluid may be substantially drained from the vessel 118 via the outlet 146, as will be appreciated by persons of ordinary skill in the art having the benefit of the disclosure.

Further, to inspect the interior of the vessel 118 for corrosion and/or damage, a user may access the manway 134 (e.g., by opening the lid 136) and may visually or physically inspect the interior of the vessel 118 for damage, cracks or scratches in the lining 132, corrosion, and combinations thereof, for example. Further, the user may inspect the exterior of the vessel 118 for corrosion and/or damage by observing the top 138, bottom 140, and sides 142 of the sidewall 130 and/or substantially the entire surfaces of the top 138, bottom 140, and sides 142 of the sidewall 130, for example.

Figure 9:
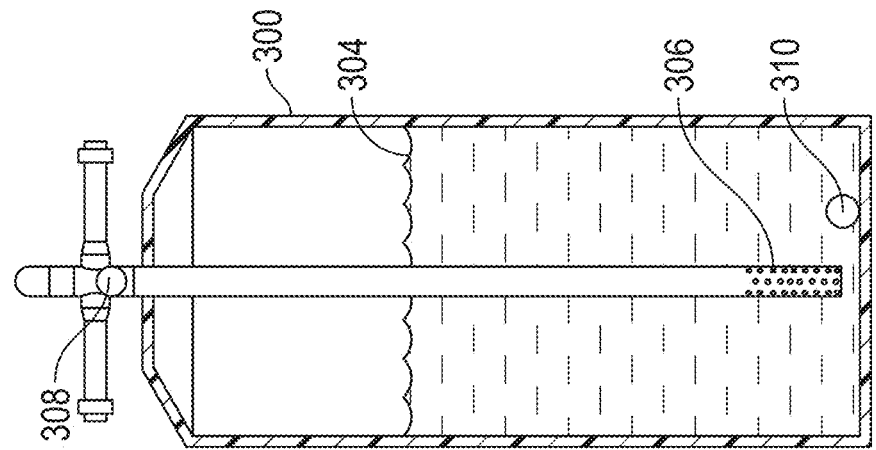
FIG. 9 is a sectional view of the scrubber tank of FIG. 8.
Figure 8:
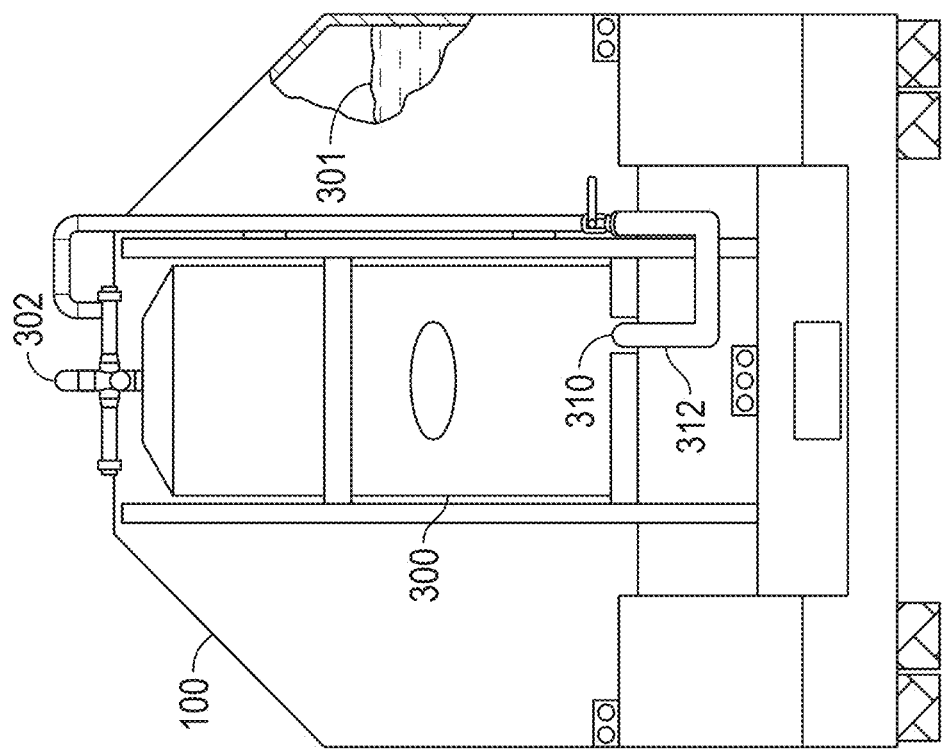
FIG. 8 is a rear elevational view of the storage tank of FIG. 1 showing a scrubber tank mounted thereto.

Referring to FIGS. 8 and 9, the storage tank 100 and 100a can contain fuming chemicals, such as an acidic solution 301. For example, during an frac job, ten to twenty-five or more storage tanks containing 25% hydrochloric acid (HCl) in the same location is not uncommon. In such cases, it is desirable to keep the acid fumes from being released. In one embodiment, a scrubber tank 300 is mounted to the back of the frame, as shown in FIG. 8. The scrubber tank 300 receives vapor from the acid storage tank 100 and absorbs the acid fumes with water and/or other absorption materials.

Vapors from the storage tank 100 are vented from the storage tank 100 through an acid resistant conduit 302 so the vapors pass into an absorbing fluid or scrubber fluid 304 disposed in the scrubber tank 300. The vapors are dispersed into the scrubber fluid 304 through perforations 306 formed in the conduit 302. Suitable examples of scrubber fluids include, but are not limited to, water and a salt water solution. The acid vapors are absorbed into the scrubber fluid 304 and any air and remaining vapors are vented from the scrubber tank 300 through a vent line 308 provided at an upper end of the scrubber tank 300. The vent line 308 is separate from the conduit 302. Once the scrubber fluid 304 becomes saturated with acid, the scrubber fluid 304 can be removed through a drain hole 310 provided with a valve (not shown) and pumped back to the storage tank 100 via an inlet conduit 312. The scrubber tank 300 will then be recharged with fresh scrubbing fluid through an inlet.

From the above description, it is clear that the inventive concepts disclosed herein are well adapted to carry out the objects and to attain the advantages mentioned and those inherent in the inventive concepts disclosed herein. While preferred embodiments of the inventive concepts disclosed have been described for this disclosure, it will be understood that numerous changes may be made which will readily suggest themselves to those skilled in the art and which are accomplished within the scope and coverage of the inventive concepts disclosed and claimed herein.

What is claimed is:
1. A storage tank, comprising:
a frame;
a vessel supported by the frame, the vessel formed of a polymeric material and having a first end, a second end, a sidewall extending from the first end to the second end, a top, a bottom, and an outlet fluidly coupled with the bottom, an acidic solution being disposable in the vessel; and
a scrubber tank supported by the frame, a vapor absorption material being disposable in the scrubber tank, wherein the scrubber tank is fluidly connected to the top of the vessel to receive vapors released from the acidic solution to the top of the vessel when the acidic solution is disposed in the vessel and the vapor absorption material is disposed in the scrubber tank so the vapors pass from the top of the vessel and into the vapor absorption material, and
wherein the bottom of the vessel has a trough aligned with the outlet for evacuation of the acidic solution from the vessel.

2. The acid storage tank of claim 1, wherein the scrubber tank is fluidly connected to the vessel with a conduit, and wherein at least a portion of the conduit extends into the scrubber tank adjacent a lower end thereof.

3. The acid storage tank of claim 2, wherein a portion of the conduit adjacent the lower end of the scrubber tank has a plurality of perforations.

4. The acid storage tank of claim 1, wherein the scrubber tank has a vent at an upper end thereof.

5. The acid storage tank of claim 4, wherein the scrubber tank has a drain at a lower end thereof.

6. The acid storage tank of claim 5, wherein the drain is fluidly connected to the vessel to permit the vapor absorption material to be passed into the vessel.

7. The acid storage tank of claim 1, wherein the tank assembly further includes an electronic level monitoring device communicating with the interior of the vessel and sealingly connected to the vessel.

8. The acid storage tank of claim 7, wherein the electronic level monitoring device includes a light assembly mounted on the exterior of the vessel for visually indicating the level of the fluid in the vessel.

9. A storage tank, comprising:
a frame;
a vessel supported by the frame, the vessel formed of a polymeric material and having a first end, a second end, a sidewall extending from the first end to the second end, a top, a bottom, and an outlet fluidly coupled with the bottom;

an acidic solution disposed in the vessel;
a scrubber tank supported by the frame; and
a vapor absorption material disposed in the scrubber tank,
wherein the scrubber tank is fluidly connected to the top of the vessel to receive vapors released from the acidic solution to the top of the vessel so the vapors pass from the top of the vessel and into the vapor absorption material, and
wherein the bottom of the vessel has a trough aligned with the outlet for evacuation of the acidic solution from the vessel.

10. The acid storage tank of claim 9, wherein the scrubber tank is fluidly connected to the vessel with a conduit, and wherein at least a portion of the conduit extends into the scrubber tank adjacent a lower end thereof.

11. The acid storage tank of claim 10, wherein a portion of the conduit adjacent the lower end of the scrubber tank has a plurality of perforations.

12. The acid storage tank of claim 9, wherein the scrubber tank has a vent at an upper end thereof.

13. The acid storage tank of claim 12, wherein the scrubber tank has a drain at a lower end thereof.

14. The acid storage tank of claim 13, wherein the drain is fluidly connected to the vessel to permit the vapor absorption material to be passed into the vessel.

15. The acid storage tank of claim 9, wherein the tank assembly further includes an electronic level monitoring device communicating with the interior of the vessel and sealingly connected to the vessel.

16. The acid storage tank of claim 15, wherein the electronic level monitoring device includes a light assembly mounted on the exterior of the vessel for visually indicating the level of the fluid in the vessel.

* * * * *